(12) United States Patent
Kim et al.

(10) Patent No.: US 10,538,141 B2
(45) Date of Patent: Jan. 21, 2020

(54) CONTROL APPARATUS AND METHOD FOR COOLING FAN OF VEHICLE

(71) Applicants: Hyundai Motor Company, Seoul (KR); Kia Motors Corporation, Seoul (KR)

(72) Inventors: Yeong Jun Kim, Gyeonggi-do (KR); Taewan Kim, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 398 days.

(21) Appl. No.: 15/364,683

(22) Filed: Nov. 30, 2016

(65) Prior Publication Data

US 2018/0111444 A1 Apr. 26, 2018

(30) Foreign Application Priority Data

Oct. 26, 2016 (KR) ................. 10-2016-0140185

(51) Int. Cl.
*B60H 1/32* (2006.01)
*B60H 1/00* (2006.01)
*B60K 11/06* (2006.01)
*F01P 7/04* (2006.01)
*F01P 5/04* (2006.01)

(52) U.S. Cl.
CPC ....... *B60H 1/00464* (2013.01); *B60H 1/3216* (2013.01); *B60K 11/06* (2013.01); *F01P 7/048* (2013.01); *B60H 2001/3251* (2013.01); *B60H 2001/3277* (2013.01); *F01P 2005/046* (2013.01); *F01P 2025/66* (2013.01)

(58) Field of Classification Search
CPC ............ B60H 1/00821; B60H 1/00864; B60H 1/00828; B60H 2001/3248; B60H 2001/3277
See application file for complete search history.

(56) References Cited

U.S. PATENT DOCUMENTS

| 4,425,766 A | * | 1/1984 | Claypole | ................. F01P 7/048 |
| | | | | 123/41.12 |
| 4,481,784 A | * | 11/1984 | Elmslie | ................ B60H 1/3208 |
| | | | | 62/133 |
| 5,560,213 A | * | 10/1996 | Wieszt | ............... B60H 1/00978 |
| | | | | 62/125 |

(Continued)

FOREIGN PATENT DOCUMENTS

| JP | 05263641 A | 10/1993 |
| JP | 4465910 B2 | 5/2010 |

(Continued)

*Primary Examiner* — Nelson J Nieves
(74) *Attorney, Agent, or Firm* — Slater Matsil, LLP

(57) ABSTRACT

An apparatus for a vehicle includes a cooling fan installed in an engine compartment of the vehicle. A fan motor is connected with the cooling fan to drive the cooling fan. A state detector is configured to detect state data, and a controller is configured to control the cooling fan based on the state data when an intake temperature is within a predetermined range, to determine whether the state data satisfies a decision reference condition, and to lock the fan motor according to a change rate of air conditioner refrigerant pressure during a measurement time when the state data satisfies the decision reference condition.

12 Claims, 7 Drawing Sheets

(56) References Cited

U.S. PATENT DOCUMENTS

| | | | | |
|---|---|---|---|---|
| 6,318,097 | B1* | 11/2001 | Wieszt | B60H 1/00978 |
| | | | | 62/126 |
| 2004/0040319 | A1* | 3/2004 | Lee | B60H 1/3204 |
| | | | | 62/133 |
| 2004/0206099 | A1* | 10/2004 | Kim | B60H 1/3204 |
| | | | | 62/178 |
| 2009/0314847 | A1* | 12/2009 | Nemoto | B60H 1/00764 |
| | | | | 237/5 |
| 2015/0322844 | A1* | 11/2015 | Kim | B60H 1/00864 |
| | | | | 123/41.05 |
| 2015/0365039 | A1* | 12/2015 | Nakano | F01P 7/048 |
| | | | | 318/490 |
| 2016/0129755 | A1* | 5/2016 | Yoshioka | B60H 1/00764 |
| | | | | 701/36 |
| 2016/0146091 | A1 | 5/2016 | Kim | |

FOREIGN PATENT DOCUMENTS

| | | | |
|---|---|---|---|
| KR | 101601230 | B1 | 3/2016 |
| KR | 20170062304 | A | 6/2017 |

* cited by examiner

| AIR CONDITIONER SWITCH | INTAKE TEMPERATURE(℃) | AIR CONDITIONER REFRIGERANT PRESSURE(kPa) | COOLANT TEMPERATURE (℃) | | | | | |
|---|---|---|---|---|---|---|---|---|
| | | | -30 | 60 | 95 | 100 | 105 | |
| ON | Amb < 3 | P ≥ FIRST REFERENCE PRESSURE | OFF | | | | | |
| | | FIRST REFERENCE PRESSURE > P ≥ SECOND REFERENCE PRESSURE | OFF | | HIGH | | | HIGH |
| | | SECOND REFERENCE PRESSURE ≥ P ≥ THIRD REFERENCE PRESSURE | OFF | | | | | HIGH |
| | | THIRD REFERENCE PRESSURE > P | OFF | | | | | HIGH |

| AIR CONDITIONER SWITCH | INTAKE TEMPERATURE (°C) | AIR CONDITIONER REFRIGERANT PRESSURE(kPa) | VEHICLE SPEED (KPH) | COOLANT TEMPERATURE (°C) | | | | | |
|---|---|---|---|---|---|---|---|---|---|
| | | | | -30 | 60 | 95 | 100 | 105 | |
| ON | Amb ≥ 3 | P ≥ FIRST REFERENCE PRESSURE | ALL | OFF | HIGH | | | | |
| | | SECOND REFERENCE PRESSURE ≥ P ≥ THIRD REFERENCE PRESSURE | V<45 | OFF | LOW | | HIGH | | |
| | | | 45≤V<80 | OFF | | | LOW | HIGH | |
| | | | 80<V | OFF | | | | | HIGH |
| | | FIRST REFERENCE PRESSURE > P ≥ SECOND REFERENCE PRESSURE | V<45 | OFF | | LOW | | HIGH | |
| | | | 45≤V<80 | OFF | | | LOW | HIGH | |
| | | | 80<V | OFF | | | | | HIGH |
| | | THIRD REFERENCE PRESSURE > P | ALL | OFF | | | | | HIGH |

CONTROL APPARATUS AND METHOD FOR COOLING FAN OF VEHICLE

CROSS-REFERENCE TO RELATED APPLICATIONS

This application claims priority to and the benefit of Korean Patent Application No. 10-2016-0140185 filed in the Korean Intellectual Property Office on Oct. 26, 2016, the entire contents of which are incorporated herein by reference.

TECHNICAL FIELD

The present invention relates to an apparatus for controlling a cooling fan of a vehicle, and more particularly, to an apparatus and a method for controlling a cooling fan of a vehicle capable of preventing damage to a fan motor by locking the fan motor in winter.

BACKGROUND

Generally, a large amount of heat is generated in an engine of a vehicle, and when a temperature of the engine rises to an appropriate temperature or more, there is a risk of explosion. Therefore, a coolant is circulated in the vicinity of the engine in order to cool the engine, thereby lowering the temperature of the engine. A heated coolant is heat-radiated in a radiator, and a cooling fan is installed in an engine compartment of the vehicle in order to improve a heat radiation effect of the radiator.

The cooling fan maintains a temperature of the coolant in an appropriate condition to prevent overheat of the engine and allow performance of the engine to be optimally exhibited. The cooling fan is mainly driven by a motor.

In a severe cold area, moisture or snow is introduced into the cooling fan, such that freezing of the cooling fan often occurs. Therefore, at the time of the freezing of the cooling fan, the cooling fan is not operated even in a condition in which the cooling fan is turned on.

In the severe cold area, the cooling fan is not generally operated. However, when a driver presses a defrost button in order to remove fog or frost, an air conditioner is operated, such that an air conditioner refrigerant pressure gradually rises. When the air conditioner refrigerant pressure becomes a predetermined pressure or more, it arrives at a region in which the cooling fan should be operated. However, the cooling fan is not operated due to locking of the motor caused by the freezing of the cooling fan. In addition, when a locking time becomes long, the motor is damaged or a fire occurs in the engine compartment in the worst case.

Accordingly, in the conventional case, to prevent the motor from being damaged, the fan motor was locked on the basis of ignition-off time in winter.

However, in the conventional case, logic was too complex and differently applied to various kinds of vehicles, so man-hour was used excessively, and the fan motor was controlled according to ignition-off time so that accuracy was low. Also, when diurnal range is large, the fan motor did not operate, therefore it was not cool to occur driver's dissatisfaction.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide an apparatus and a method for controlling a cooling fan of a vehicle capable of locking a fan motor on the basis of change rate of air conditioner refrigerant in winter.

Further, an exemplary embodiment of the present invention provides an apparatus and a method for controlling a cooling fan of a vehicle capable of locking a fan motor according to intake temperature.

An exemplary embodiment of the present invention provides an apparatus for controlling a cooling fan of a vehicle. The cooling fan is installed in an engine compartment of the vehicle. A fan motor is connected with the cooling fan t drive the cooling fan. A state detector detects state data for controlling the cooling fan. A controller controls the cooling fan on the basis of the state data in a case in which intake temperature is within a predetermined range, deciding whether the state data satisfies decision reference condition, and locking the fan motor according to change rate of air conditioner refrigerant pressure during measurement time in a case in which the state data satisfies decision reference.

Also, the controller may confirm a first control map in a case in which the intake temperature is within a predetermined range, confirm operation signal matched to air conditioner refrigerant pressure and coolant temperature through the first control map, and operate the cooling fan on the basis of the operation signal.

Also, the controller may confirm a first change rate of the air conditioner refrigerant pressure for a first measurement time in a case in which the state data satisfies the decision reference condition, confirm a second change rate of the air conditioner refrigerant pressure by operating the cooling fan for a second measurement time, and lock the fan motor according to the first change rate and the second change rate.

Also, the controller may calculate comparison value on the basis of the first change rate and the second change rate, decide whether or not the comparison value is a decision reference or less, lock the operation of the cooling fan in the case in which the comparison value is not maintained for the duration in a state in which the comparison value is the decision reference or less.

Also, the controller may decide whether or not a compressor is operating in the case in which the intake temperature is within a predetermined range, decide whether or not a vehicle speed is zero in case in which the compressor is operating, and decide whether or not the locking of the fan motor in case in which the vehicle speed is zero Also, the controller may confirm a state of an air conditioner switch, and confirms whether or not the fan motor is locked in case in which the air conditioner switch is on.

Also, the controller may decide whether or not the intake temperature is a reference temperature or more in the case in which the intake temperature is not within the predetermined range, confirm a second control map in the case in which the intake temperature is the reference temperature or more, confirms operation signal matched to air conditioner refrigerant pressure, vehicle speed and coolant temperature through the second control map, and operate the cooling fan on the basis of the operation signal.

Also, the state detector may includes at least one of a coolant temperature measurer measuring the coolant temperature; a vehicle speed measurer measuring the vehicle speed; and a refrigerant pressure measurer measuring pressure of refrigerant drained from the compressor.

Another exemplary embodiment of the present invention provides a control method for cooling fan of vehicle, including: confirming an intake air temperature in a case in which an air conditioner switch is on; deciding whether or not the intake temperature in within a predetermined range; operating the cooling fan on the basis of a state data in a case in which the intake temperature is within the predetermined range; deciding whether or not the state data satisfies a decision reference condition; and locking the fan motor during measuring time according to a change rate of an air conditioner refrigerant pressure in a case in which the state data satisfies the decision reference condition.

According to an exemplary embodiment of the present invention, the fan motor is locked on the basis of change rate of air conditioner refrigerant in winter, thereby making it possible to prevent the damage to the fan motor.

Also, the fan motor is locked by confirming intake temperature periodically, thereby accuracy may be improved, and separate components for preventing the damage to the fan motor are not necessary, thereby material cost may be reduced.

Other effects that may be obtained or are predicted by an exemplary embodiment of the present invention will be explicitly or implicitly described in a detailed description of the present invention. That is, various effects that are predicted according to an exemplary embodiment of the present invention will be described in the following detailed description.

BRIEF DESCRIPTION OF THE DRAWINGS

FIG. 3 is an illustrative view showing a first control map according to an exemplary embodiment of the present invention.

FIG. 4 is an illustrative view showing a second control map according to an exemplary embodiment of the present invention.

The following reference numbers can be used in conjunction with the drawings.

50: apparatus for controlling cooling fan of vehicle
    100: state detector
    110: controller
    120: an air conditioner switch
    125: compressor
    130: relay
    140: connector
    150: blower assembly
    153: register
    157: fan motor
    160: cooling fan

DETAILED DESCRIPTION OF ILLUSTRATIVE EMBODIMENTS

Hereinafter, an operation principle of an apparatus and a method for controlling a cooling fan of a vehicle according to an exemplary embodiment of the present invention will be described in more detail with reference to the accompanying drawings. However, drawings provided below and a detailed description to be provided below relate to one preferred exemplary embodiment of several exemplary embodiments for effectively describing features of the present invention. Therefore, the present invention is not limited to only the following drawings and description.

Further, in describing the present invention, a detailed description for well-known functions or configurations will be omitted since it may unnecessarily obscure the gist of the present invention. Further, the following terms are defined in consideration of the functions in the present invention and may be construed in different ways by the intention of users and operators. Therefore, definitions of these terms should be construed based on the contents throughout the present invention.

In addition, in the following exemplary embodiments, terms will be appropriately modified, or integrated with each other, or separated from each other so as to be clearly understood by those skilled in the art to which the present invention pertains in order to efficiently describe key technical features of the present invention, but the present invention is not limited thereto.

Hereinafter, an exemplary embodiment of the present invention will be described in detail with reference to the accompanying drawings.

Figure 1:
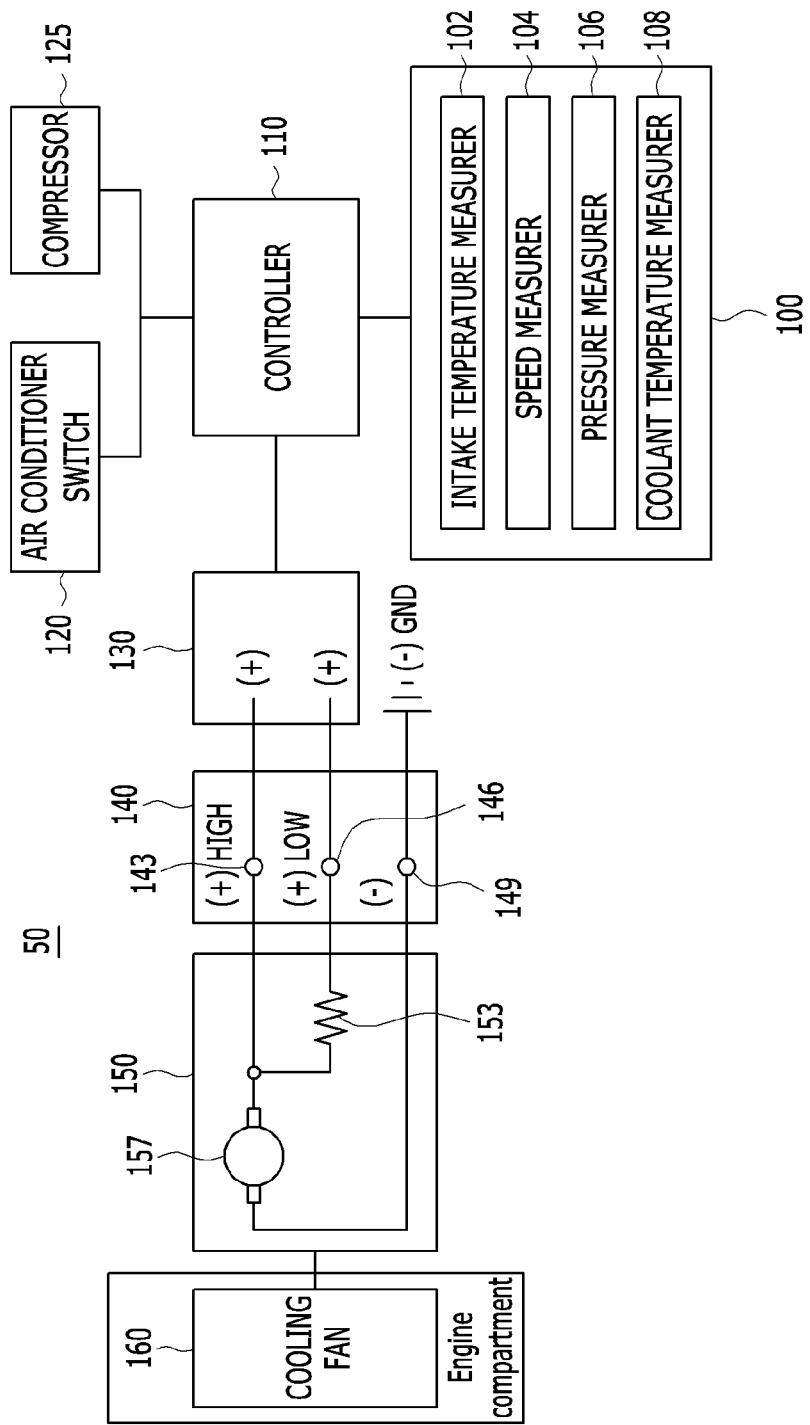
FIG. 1 is a block diagram showing an apparatus for controlling a cooling fan of a vehicle according to an exemplary embodiment of the present invention.

FIG. 1 is a block diagram showing an apparatus for controlling a cooling fan of a vehicle according to an exemplary embodiment of the present invention.

Referring to FIG. 1, the apparatus 50 for controlling a cooling fan of a vehicle includes a state detector 100, a controller 110, an air conditioner switch 120, a compressor 125, a relay 130, a connector 140, a blower assembly 150, and a cooling fan 160.

The state detector 100 detects state data required in order to control the cooling fan 160. The state detector 100 includes an intake air temperature measurer 102, a speed measurer 104, a pressure measurer 106, and a coolant temperature measurer 108.

The intake air temperature measurer 102 measures an intake air temperature, which is a temperature of air introduced into the vehicle, and provides the measured temperature to the controller 110.

The speed measurer 104 measure a vehicle speed, which is a speed of the vehicle, and provides the measured vehicle speed to the controller 110.

The pressure measurer 106 measures an air conditioner refrigerant pressure, and provides the measured air conditioner refrigerant pressure to the controller 110. At this time, the pressure measurer 106 may measure pressure of refrigerant drained from the compressor 125.

The coolant temperature measurer 108 measures a coolant temperature of an engine, and provides the measured coolant temperature to the controller.

The controller 110 controls at least one of the state detector 100, the air conditioner switch 120, the compressor 125, the relay 130, the connector 140, the blower assembly 150, and the cooling fan 160, which are components of the apparatus 50 for controlling a cooling fan of a vehicle, in order to operate or stop the cooling fan 160.

The controller controls the cooling fan on the basis of the state data in a case in which intake temperature is within a predetermined range, and is provided state data from the state detector 100. The controller 110 decides whether the state data satisfies decision reference condition. The controller 110 confirms a change rate of the air conditioner refrigerant pressure for a measurement time in a case in which the state data satisfies the decision reference condition, and locks the fan motor 157 according to the change rate to stop operation of the cooling fan 160.

For this purpose, the controller 110 may be implemented by at least one processor operated by a predetermined program, which may be programmed to perform the respective steps of a method for controlling a cooling fan of a vehicle according to an exemplary embodiment of the present invention. A method for controlling the cooling fan will be described in more detail with reference to FIGS. 2 to 7.

The air conditioner switch 120 turns on or turns off an air conditioner or Defrost. That is, the air conditioner switch 120 may turn on or turn off the air conditioner or the Defrost by a driver or the controller 110.

The compressor 125 compresses a refrigerant at a high temperature and a high pressure to operate the air conditioner, when the air conditioner is turned on by the air conditioner switch 120.

The relay 130 provides an operation signal to the connector 140 depending on a control of the controller 110.

The connector 140 receives the operation signal from the relay 130 to drive the fan motor 157. To this end, the connector 140 includes a high speed connector 143, a low speed connector 146, and a ground connector 149. The high speed connector 143 is directly connected to the fan motor 157, and the low speed connector 146 is connected to the fan motor 157 through a resistor 153. The ground connector 149 is connected to the fan motor 157 and a ground. Here, the high speed connector 143, the low speed connector 146, and the ground connector 149 may also be formed of a switch.

The connector 140 drives the fan motor 157 through the low speed connector 146 and the resistor 153 when it receives a low speed operation signal from the relay 130. In addition, the connector 140 drives the fan motor 157 through the high speed connector 143 when it receives a high speed operation signal from the relay 130.

The blower assembly 150 includes the fan motor 157 and the resistor 153.

The fan motor 157 rotates blades included in the cooling fan 160 to operate the cooling fan 160.

The resistor 153 adjusts a speed of the fan motor 157. That is, the larger the resistance value of the resistor 153, the lower the speed at which the fan motor 157 is driven.

The cooling fan 160 is driven by the fan motor 157 included in the blower assembly 150. The cooling fan 160 maintains a temperature of a coolant in an appropriate condition to prevent overheat of the engine and allow performance of the engine to be optimally exhibited.

Hereinafter, a method for controlling a cooling fan in a vehicle will be described with reference to FIGS. 2 to 7.

Figure 2:
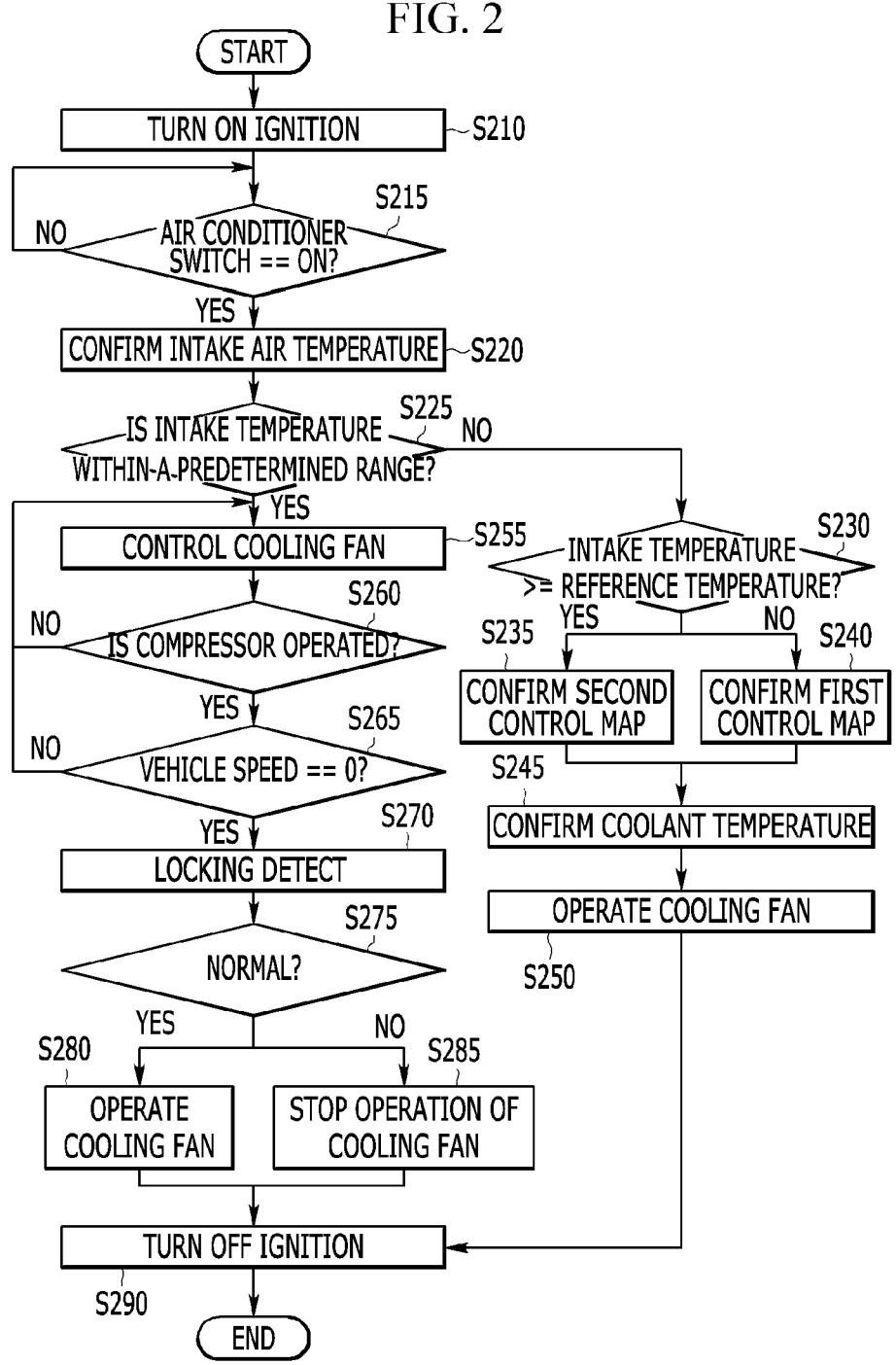
FIG. 2 is a flow chart showing a method for controlling a cooling fan of a vehicle according to an exemplary embodiment of the present invention.

FIG. 2 is a flow chart showing a method for controlling a cooling fan of a vehicle according to an exemplary embodiment of the present invention, FIG. 3 is an illustrative view showing a first control map according to an exemplary embodiment of the present invention, and FIG. 4 is an illustrative view showing a second control map according to an exemplary embodiment of the present invention.

Referring to FIG. 2, the controller 110 confirms whether or not the ignition is turned on S210. Here, the controller 110 may confirm whether or not the ignition is turned on by receiving an ignition-on signal from an initial detector (not shown).

The controller 110 confirms whether or not the air conditioner switch 120 is turned on S215. That is, the controller 110 may decide whether or not the driver turned on the air conditioner switch 120 or the Defrost button.

Meanwhile, the controller 110 may return step of S215 to monitor whether or not the air conditioner switch 120 is on in the case in which the air conditioner switch 120 is turned off.

The controller 110 confirms intake temperature in the case in which the air conditioner switch 120 is turned on S220. That is, the controller 110 is provided with the intake temperature from the intake air temperature measurer 102 and confirms the provided intake air.

The controller 110 decides whether or not the intake temperature is within a predetermined temperature S225. That is, the controller 110 may decide whether or not the intake temperature is within the reference temperature and lowest temperature or more. Here, the reference temperature is a temperature for deciding whether it is winter or summer, the lowest temperature is a temperature for deciding whether or not the cooling fan 160 freezes. Here, the reference temperature and the lowest temperature may be set by a worker or be set through a predefined algorithm (for example, a program or a probability model. For example, the reference temperature may be 3° C., and the lowest temperature may be −7° C.

The controller 110 decides whether or not the intake temperature is a reference temperature or more in the case in which the intake temperature is not within the predetermined range S230.

The controller 110 confirms a second control map in the case in which the intake temperature is the reference temperature or more S235. That is, the controller 110 decides that it is summer in the case in which the intake temperature is the reference temperature or more, and confirms the second map corresponding to summer. At this time, the second control map may be set by matching operation signal to respective a plurality of air conditioner refrigerant pressure, vehicle speed, and coolant temperature for controlling the cooling fan 160 in summer. The second control map is a predetermined map in advance, and may be set by a worker or be set through a predefined algorithm (for example, a program or a probability model). For example, the second control map may be set like drawing number '400' of FIG. 4.

The controller 110 confirms a first control map in a case in which the intake temperature is the reference temperature or less S240. That is, the controller 110 turns off the compressor 125 and the air conditioner switch 120 to turn off the air conditioner in the case in which the intake temperature is lowest temperature or less.

Further, the controller 110 confirms the first control map corresponding to winter. At this time, the first control map may be set by matching operation signal to a respective a plurality of air conditioner refrigerant pressure and coolant temperature. For example, the first control map may be set like drawing number '300' of FIG. 3.

The controller 110 confirms coolant temperature S245. That is, the controller 110 is provided with the coolant temperature from the coolant temperature measurer 108 and confirms the provided coolant temperature. The controller 110 is provided with the air conditioner refrigerant pressure from the air conditioner refrigerant pressure measurer 106 and confirms the provided air conditioner refrigerant pressure.

Meanwhile, the controller 110 is provided with vehicle speed from the vehicle speed measurer 104 in the case in which the intake temperature is the reference temperature or more, and confirms the vehicle speed.

The controller 110 operates the cooling fan 160 on the basis of the coolant temperature and the air conditioner refrigerant pressure S250. In other words, the controller 110 confirms operation signal matched to coolant temperature, air conditioner refrigerant pressure and vehicle speed through the second control map. The controller 110 provides the confirmed operation signal to the fan motor 157 through the relay 130 and the connector 140, and operates the cooling fan 160 through the fan motor 157.

For example, the controller 110 confirms low speed operation signal through the second control map in the case in which the intake temperature is 3 degrees or more, the air conditioner refrigerant pressure is in between the first reference pressure and the second reference pressure, the vehicle speed is in between 45 and 80, and the coolant temperature is in between 95 and 100, and the controller 110 may control the cooling fan 160 through the low operation signal.

Also, the controller 110 confirms the operation signal matched to the coolant temperature and the air conditioner refrigerant pressure through the first control map. The controller 110 provides the operation signal to the fan motor 157 through the relay 130 and the connector 140, and operates the cooling fan 160 through the fan motor 157. At this time, the operation signal may be a high speed operation signal. Accordingly, the cooling fan 160 operates in a high speed to lower engine temperature.

The controller 110 controls the cooling fan 160 in the case in which the intake temperature is within the predetermined range S255. That is, controller 110 may confirm the operation signal on the basis of the air conditioner refrigerant pressure and the coolant temperature through the first control map in the case in which the intake temperature is within the predetermined range, and controls the operation of the cooling fan 160 on the basis of the operation signal.

The controller 110 decides whether or not the compressor 125 is operating S260.

Meanwhile, the controller 110 may return to the step of S255 to control the cooling fan 160 through the first control map in the case in which the compressor 125 is not operating. The controller 110 decides whether or not a vehicle speed is zero in the case in which the compressor 125 is operating S265. That is, the controller 110 confirms the vehicle speed provided from the speed measurer 104 in the case in which the compressor 125 is operating. The controller 110 decides whether or not it is 0 to decide whether or not the vehicle is in idle state. The controller 110 generates operation signal for operating the cooling fan 160 in the case of the vehicle speed is 0. At this time, the operation signal may be an operation signal for operating the cooling fan 160 in a low speed.

The controller 110 conducts locking detection about whether operation of the cooling fan 160 stops by locking the fan motor 157 or not S270. This locking detection method will be described in detail with reference to FIG. 2.

The controller 110 decides whether or not the locking detection result is normal S275.

The controller 110 operates the cooling fan 160 in the case in which the locking detection is normal S280. That is, the controller 110 may operate the cooling fan 160 on the basis of the state data in the case in which the locking detection result is normal.

The controller 110 stops the operation of the cooling fan in the case in which the locking detection result is not normal S285. That is, the controller 110 locks the fan motor 157 in the case in which the locking detection result is locking to stop the operation of the cooling fan 160. Also, the controller 110 stops the operation of the compressor 125.

The controller 110 confirms whether or not ignition is off S290. That is, the controller 110 finishes the control of the cooling fan in the case in which the ignition is off.

Figure 5:
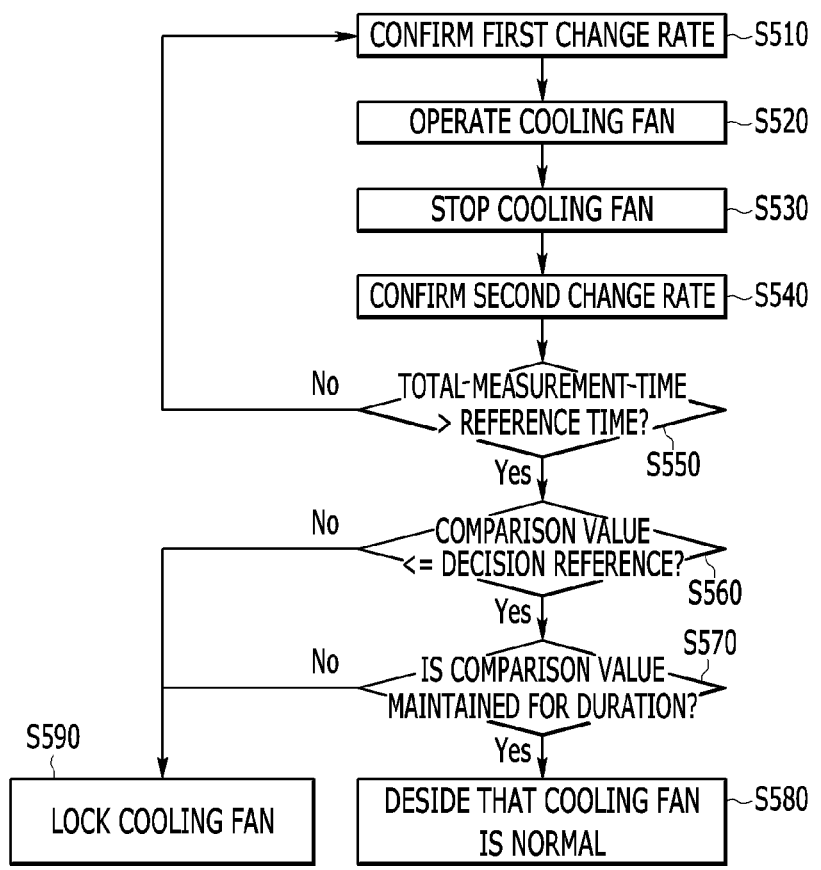
FIG. 5 is a flow chart showing a method for detecting locking in the method for controlling a cooling fan of a vehicle according to an exemplary embodiment of the present invention.
Figure 6:
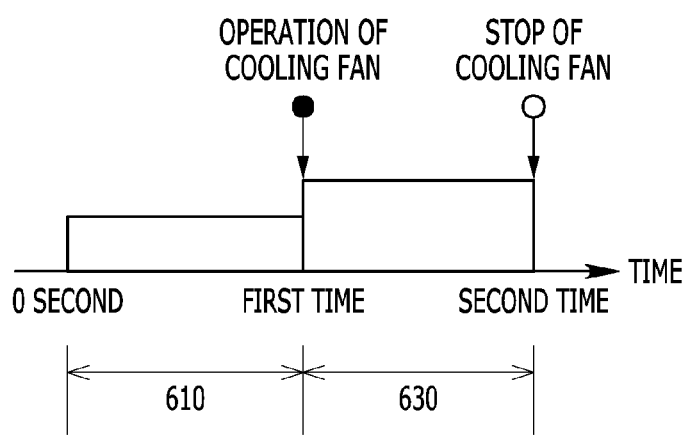
FIG. 6 is an illustrative view for describing the method for detecting locking in the method for controlling a cooling fan of a vehicle according to an exemplary embodiment of the present invention.
Figure 7:
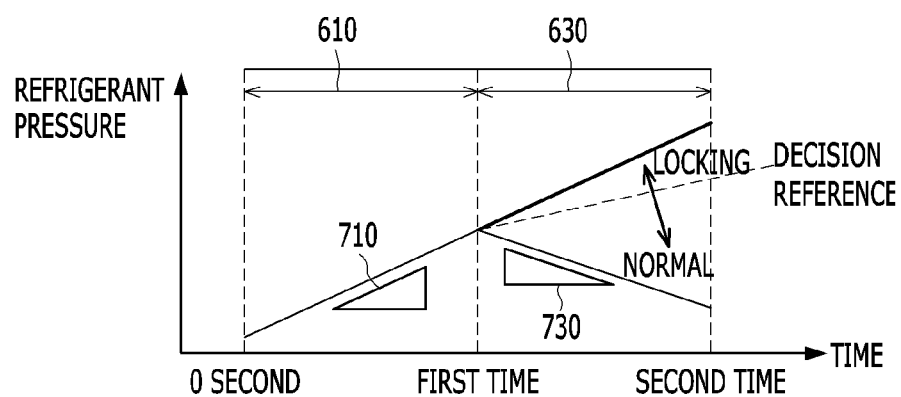
FIG. 7 is an illustrative view for describing a first change rate and a second change rate in the method for controlling a cooling fan of a vehicle according to an exemplary embodiment of the present invention.

FIG. 5 is a flow chart showing a method for detecting locking in the method for controlling a cooling fan of a vehicle according to an exemplary embodiment of the present invention, FIG. 6 is an illustrative view for describing the method for detecting locking in the method for controlling a cooling fan of a vehicle according to an exemplary embodiment of the present invention, and FIG. 7 is an illustrative view for describing a first change rate and a second change rate in the method for controlling a cooling fan of a vehicle according to an exemplary embodiment of the present invention.

Referring to FIG. 5, the controller 110 confirms a first change rate of the air conditioner refrigerant pressure for a first measurement time S510. Here, the first measure time may be time transferring operation signal to the fan motor 157 through the relay 130 and the connector 140. At this time, as shown in FIG. 6, the first measurement time 610 may be from 0 second to a first time. For example, the first time may be 3 seconds.

In other words, the controller is provides with a first air conditioner refrigerant pressure from the pressure measurer 106 at 0 second, and a second air conditioner refrigerant pressure from the pressure measurer 106 at the first time. The controller 110 calculates the first change rate on the basis of the first air conditioner refrigerant pressure and the second air conditioner refrigerant pressure. Here, the first change rate may be expressed as a slope 710, as shown in FIG. 7.

The controller 110 operates the cooling fan 160 for a second measurement time S520. In other words, a low speed connector 140 operates the fan motor 157 through the resistor 153 in the case in which operation signal is received from the relay 130. Therefore, the cooling fan 160 may be operated by operating the fan motor 157.

Here, as shown in FIG. 6, the second measurement time 630 may be time that the cooling fan 160 is operating, and may be a predetermined value. The second measurement time 630 may be frome the first time to the second time. For example, the second time may be 6 seconds.

The controller 110 stops the operation of the cooling fan 160 at the second time.

The controller 110 confirms the second change rate of the air conditioner refrigerant pressure for the second measurement time S530. Specifically, the controller 110 is provided with a third air conditioner refrigerant pressure from the pressure measurer 106 at the first time, and a fourth air conditioner refrigerant pressure from the pressure measurer 106 at the second time.

The controller 110 calculates the second change rate on the basis of the third air conditioner refrigerant pressure and the fourth air conditioner refrigerant pressure. Here, the second change rate may be expressed as a slope 730, as shown in FIG. 7.

The controller 110 decides whether or not total measurement time is reference time or more S540. That is, the controller 110 calculates total measurement time by adding the first measurement time and the second measurement time. The controller 110 decides whether or not the total measurement time is the reference time or more. At this time, the reference time may be a time that is a reference whether or not the change rate for a predetermined time is measured exactly. For example, the reference time may be 6 seconds.

Meanwhile, the controller 110 may return to S510 and confirm the first change rate in the case in which the total measurement time is the reference time or less.

The controller 110 decides whether or not a comparison value is a decision reference or less S550. Specifically, the controller 110 calculates the comparison value on the basis of the first change rate and the second change rate. That is, the controller 110 may calculates the comparison value by [equation 1].

$$C=B/A \qquad [\text{equation 1}]$$

Here, C is the comparison value, A is the first change rate, and B is the second change rate.

The controller 110 decides whether or not the comparison value is the decision reference or less S560. Here, the decision reference may be a value that is a reference whether or not the fan motor 157 is locked. For example, the decision reference may be 0.7.

The controller 110 decides whether or not the comparison value maintains for duration time in the state in which the comparison value is the decision reference or less S570. At this time, the duration time may be time for deciding whether or not the fan motor 157 is locked, and may be a predetermined value. For example, the duration time may be 2 seconds.

The controller 110 operates the cooling fan 160 in the case in which the duration time is maintained in the state in which the comparison value is the decision reference or less S580. That is, the controller 110 generates normally the locking detection result in the case in which the duration time is maintained in the state in which the comparison value is the decision reference or less, and may operate the cooling fan 160.

Meanwhile, the controller 110 stops the cooling fan 160 in the case in which the comparison value exceeds the decision reference or in the case in which the duration time is not maintained in the state in which the comparison value is the decision reference or less S590. That is, the controller 110 generates the locking detection result as a locking in the case in which the comparison value exceeds the decision reference or in the case in which the duration time is not maintained in the state in which the comparison value is the decision reference or less, and locks the fan motor 157 to stop the operation of the cooling fan 160.

Accordingly, the apparatus for controlling a cooling fan of a vehicle confirms intake temperature, confirms the change rate of the air conditioner refrigerant pressure on the case in which the intake temperature is within a predetermined range, locks the fan motor 157 on the basis of the change rate of the air conditioner refrigerant pressure and stops the operation of the cooling fan 160. Therefore, damage to the fan motor 157 may be prevented, and accuracy may be improved since the intake temperature is constantly monitored and the cooling fan 160 is controlled on the basis of the intake temperature.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for a vehicle, the apparatus comprising:
    a cooling fan installed in an engine compartment of the vehicle;
    a fan motor connected with the cooling fan to drive the cooling fan;
    a state detector configured to detect state data; and
    a controller configured to control the cooling fan based on the state data when an intake temperature is within a predetermined range, to determine whether the state data satisfies a decision reference condition, and to lock the fan motor according to a plurality of change rates of air conditioner refrigerant pressure during measurement times when the state data satisfies the decision reference condition;
    wherein the plurality of change rates includes a first change rate and a second change rate and the measurement times include a first measurement time and a second measurement time;
    wherein the controller is configured to confirm the first change rate of the air conditioner refrigerant pressure for the first measurement time when the state data satisfies the decision reference condition, to confirm the second change rate of the air conditioner refrigerant pressure by operating the cooling fan for the second measurement time, and to lock the fan motor according to the first change rate and the second change rate; and
    wherein the controller is configured to calculate a comparison value based on the first change rate and the second change rate, to determine whether or not the comparison value is less than or equal to the decision reference condition, and to lock operation of the fan motor when the comparison value is not maintained for a duration in a state in which the comparison value is less than or equal to the decision reference condition.

2. The apparatus of claim 1, wherein the controller is configured to confirm a first control map when the intake temperature is within the predetermined range, to confirm an operation signal matched to the air conditioner refrigerant pressure and a coolant temperature through the first control map, and to control the operation of the cooling fan based on the operation signal.

3. The apparatus of claim 1, wherein the controller is configured to determine whether or not a compressor is operating when the intake temperature is within the predetermined range, to determine whether or not a vehicle speed is zero when the compressor is operating, and to determine whether or not to lock the fan motor when the vehicle speed is zero.

4. The apparatus of claim 1, wherein the controller is configured confirm a state of an air conditioner switch, and to confirm whether or not the fan motor is locked when the air conditioner switch is on.

5. The apparatus of claim 1, wherein the controller is configured to determine whether or not the intake temperature is greater than or equal to a reference temperature when the intake temperature is not within the predetermined range, to confirm a second control map when the intake temperature is greater than or equal to the reference temperature, to confirm an operation signal matched to the air conditioner refrigerant pressure, vehicle speed and coolant temperature through the second control map, and to control operation of the cooling fan based on the operation signal.

6. The apparatus of claim 1, wherein the state detector comprises a coolant temperature measurer.

7. The apparatus of claim 1, wherein the state detector comprises a vehicle speedometer configured to measure speed of the vehicle.

8. The apparatus of claim 1, wherein the state detector comprises a refrigerant pressure measurer configured to measure the air conditioner refrigerant pressure drained from a compressor of the vehicle.

9. A method for controlling a cooling fan of a vehicle, the method comprising:
   confirming an intake air temperature when an air conditioner switch is on;
   determining whether or not the intake air temperature is within a predetermined range;
   operating the cooling fan on based on state data when the intake air temperature is within the predetermined range;
   determining whether or not the state data satisfies a decision reference condition; and
   locking a fan motor of the cooling fan during measurement times according to a plurality of change rates of an air conditioner refrigerant pressure when the state data satisfies the decision reference condition, wherein the plurality of change rates includes a first change rate and a second change rate and the measurement times include a first measurement time and a second measurement time and wherein locking the fan motor comprises:
      confirming the first change rate of the air conditioner refrigerant pressure for the first measurement time;
      operating the cooling fan for the second measurement time;
      confirming the second change rate of the air conditioner refrigerant pressure for the second measuring time; and
      locking the fan motor according to the first change rate and the second change rate; and
   wherein locking the fan motor comprises:
      calculating a comparison value based on the first change rate and the second change rate;
      deciding whether or not the comparison value is less than or equal to the decision reference condition;
      deciding whether or not the comparison value is maintained for a duration in a state in which the comparison value is less than or equal to the decision reference condition; and
      locking the fan motor when the comparison value is not maintained for the duration.

10. The method of claim 9, wherein the comparison value is calculated through an equation $C=B/A$, where C is the comparison value, A is the first change rate, and B is the second change rate.

11. The method of claim 9, wherein operating the cooling fan comprises:
    confirming a first control map when the intake air temperature is within the predetermined range;
    confirming the air conditioner refrigerant pressure of the state data and operation signal matched to coolant temperature through the first control map; and
    operating the cooling fan based on the operation signal.

12. The method of claim 9, wherein determining whether or not the state data satisfies the decision reference condition comprises:
    determining whether or not a compressor operates; and
    determining whether or not a vehicle speed is zero in a case in which the compressor is operating.

* * * * *